Aug. 7, 1934.   L. EDELMANN   1,969,168
TUBE CUTTER
Filed July 27, 1932

Inventor
Leo Edelmann
By Lloyd W. Patch
Attorney

Patented Aug. 7, 1934

1,969,168

UNITED STATES PATENT OFFICE 1,969,168

TUBE CUTTER

Leo Edelmann, Chicago, Ill., assignor to E. Edelmann & Co., Chicago, Ill., a corporation of Illinois Application July 27, 1932, Serial No. 625,126

3 Claims. (Cl. 81—192)

My invention relates to improvements in tube cutters and particularly to an implement of this character intended and adapted to be used in cutting tubes of copper, brass, block tin, lead, or other materials.

An object of my present invention is to provide a tube cutter that can be used to quickly and neatly sever tubing to give a clean and straight cut without deforming or injuring the tubing in any manner on either side of the cut.

Another object is to provide a tool which can be adjusted to take various sizes of tubings and which is of such character that it can be used upon a piece of tubing while held in the hand, thus obviating the necessity of having any particular mechanism or means to hold the tubing and avoiding injury to the tubing from vice jaws or other clamping or gripping means that might be used.

Still another object is to provide a tool of this character that is readily and easily adjusted to accommodate different sizes of tubing and is adjustable to vary the cutting pressure and to sink the cutting element as the cut progresses.

Yet another object is to so construct the parts that pressure is automatically exerted to tighten down the cutting element during the cutting operation.

With the above and other objects in view which will be apparent to those skilled in the art, my invention includes certain novel features of construction, and combinations of parts which will be hereinafter set forth in connection with the drawing and particularly pointed out in the claims.

Figure 1:
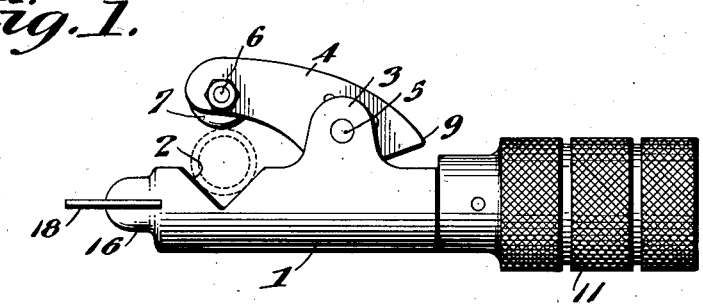
Figure 1 is a view in side elevation of a tube cutter constructed in accordance with my invention.
Figure 2:
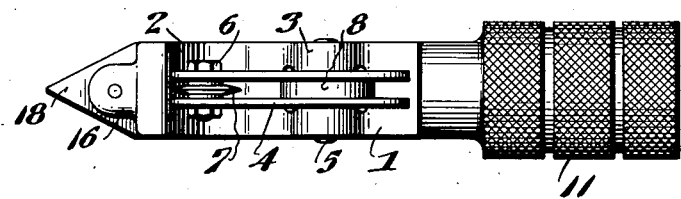
Fig. 2 is a top plan view.

A supporting head 1 is provided on one side and adjacent one end with a tubing receiving groove 2, this groove being of substantially V-shape form to take and center tubing of different sizes.

The supporting head 1 has a pair of bearing ears 3 rising therefrom at a point slightly spaced from the tube receiving groove 2, and a cutter head 4 is mounted by a pin 5 for swinging movement between the bearing ears 3 so that one end thereof moves adjacent the tube groove 2. This cutter head 4 is of bifurcated construction and has a cutter spindle 6 mounted through the swinging end thereof to be substantially centered in an arc centering within the groove 2, and a cutter wheel 7 is revolubly mounted on spindle 6. As is better shown in Fig. 3, the spindle 6 is mounted eccentrically between the arms of the cutter head 4 so that the cutting edge of the cutting wheel 7 is entirely shielded and protected from the upper side and end of the cutter head 4, and thus there is very little likelihood of the user being injured or of the cutting edge of the wheel 7 being damaged.

A segmental rack member 8 is associated with the cutter head 4 around the pin 5, and the cutter head is extended as at 9, to form a stop to limit outward swinging movement of the cutter head.

The supporting member 1 has a longitudinal bore 10 formed in the end thereof beyond the bearing ears 3, and a handle member 11 has a spindle 12 thereon extending into this bore 10 to carry a worm 13 meshing with the teeth of the segmental rack member 8.

It is intended that the spindle 12 shall be free for rotary movement within the bore 10 and shall be held substantially against endwise shifting movement, and with this in mind a stop and retaining screw 14 is inserted through a suitably threaded opening in the wall of supporting member 1 to extend into the bore 10, washers or shoulders 15 being provided on the spindle 12 to properly space and hold the spindle with the worm 13 meshing with the teeth of the segmental rack member 8.

At the end of the supporting member 1 a boss like extension 16 provided with a slot 17 has a reaming blade 18 mounted. This reaming blade is of substantially V-shape form and can be used to clear the opening of a piece of tubing after the cutting operation.

Figure 3:
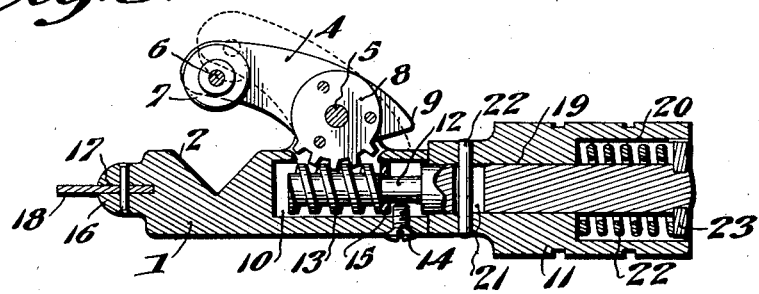
Fig. 3 is a view similar to Fig. 1 with parts in section.

As best illustrated in Fig. 3, the handle 12 has a bore 19 therein to slidably receive the spindle 12, and the bore is enlarged at the outer end of the handle as at 20. Spindle 12 extends substantially throughout the length of the handle, and is provided with an elongated slot 21 to loosely receive a pin 22 by which revoluble movement is stopped and endwise sliding movement within the bore 19 is limited. A coil spring 22 is fitted around the end of the spindle 12 within the bore 20 and a bearing washer 23 is secured on the end of the spindle in position to be engaged by the outer end of the spring 22.

In the use of my improved tool the handle 11 is turned so that the swinging end of the cutter head 4 is moved back to carry the cutting wheel 7 substantially out of the tube receiving groove 2, and the tube can then be fitted to be centered within this groove 2 to be substantially centered within the groove. Stop 9 limits outward movement to retain the cutter head 4 in such relation that the cutter wheel 7 can be conveniently brought down against the piece of tubing and this is accomplished by turning handle 11 in a clockwise direction to swing the cutter head 4 down to cause the cutter wheel 7 to bear at its sharpened edge against the piece of tubing. As the handle 11 is turned, the cutter wheel 7 will be brought into engagement with the tubing and then as movement is continued, the spindle 12 will be drawn forward against the pressure of spring 22, thereby exerting pressure through the spring 22 to force down the cutter and continuing this pressure automatically during the cutting operation. The entire tool is then revolved around the piece of tubing and as the cut is deepened the handle 11 can be twisted to swing the cutter head 4 downwardly to feed the cutter wheel 7, into the cut. This operation is continued until the tube has been cut and then the reamer blade 18 can be used to clean away any burr that may occur.

While I have herein shown and described only one particular construction and embodiment of my invention and have suggested only certain possible manners of use, it will be appreciated that changes and variations can be made in the form, construction, arrangement and assembly of the parts without departing from the spirit and scope of my invention.

I claim:

1. A tube cutter comprising a supporting member provided with a tube receiving groove and having supporting bearings adjacent to and slightly spaced from said groove, a rotatable handle by which the tool is bodily swung, a cutter head mounted in said supporting bearings, a cutter carried by said cutter head to engage with a tube in said groove as the cutter head is swung, a segmental rack associated with said cutter head, and a worm cooperating with said segmental rack and rotatable with the handle to swing said cutter head.

2. A tube cutter comprising a supporting member provided with a tube receiving groove and having supporting bearings adjacent to and slightly spaced from said groove, a cutter head mounted in said supporting bearings, a cutter carried by said cutter head to engage with a tube in said groove as the cutter head is swung, a segmental rack associated with said cutter head, a worm cooperating with said segmental rack to swing said cutter head, and spring means to automatically continue swinging movement of said cutter head during the cutting operation.

3. A tube cutter comprising a supporting member provided with a tube receiving groove and having supporting bearings adjacent to and slightly spaced from said groove, a cutter head mounted in said supporting bearings, a cutter carried by said cutter head to engage with a tube in said groove as the cutter head is swung, a segmental rack associated with said cutter head, a worm cooperating with said segmental rack to swing said cutter head, a handle by which said worm is revolved and with respect to which the worm is permitted endwise sliding movement, and a spring associated with said worm and handle acting yieldingly to exert pressure to restore said worm to a normal position.

LEO EDELMANN.